United States Patent
Ravindran (10) Patent No.: US 9,294,422 B2
(45) Date of Patent: Mar. 22, 2016

(54) SYSTEM AND METHOD FOR PROVIDING INTERNET CONTENT THROUGH SMS SERVICES

(71) Applicant: Deepak Ravindran, Bangalore (IN)

(72) Inventor: Deepak Ravindran, Bangalore (IN)

( * ) Notice: Subject to any disclaimer, the term of this patent is extended or adjusted under 35 U.S.C. 154(b) by 275 days.

(21) Appl. No.: 13/845,579

(22) Filed: Mar. 18, 2013

(65) Prior Publication Data

US 2014/0280633 A1   Sep. 18, 2014

(51) Int. Cl.
*G06F 15/16* (2006.01)
*H04L 12/58* (2006.01)
*G06F 12/00* (2006.01)

(52) U.S. Cl.
CPC ............ *H04L 51/046* (2013.01); *H04L 12/585* (2013.01); *H04L 51/066* (2013.01); *H04L 51/18* (2013.01)

(58) Field of Classification Search
CPC ......... H04L 51/36; H04L 51/14; H04L 51/34; H04L 12/58
USPC .................. 709/203, 206–207, 223–229, 250
See application file for complete search history.

(56) References Cited

U.S. PATENT DOCUMENTS

| | | | |
|---|---|---|---|
| 8,965,421 B1* | 2/2015 | Sanjeev | 455/466 |
| 2004/0003046 A1* | 1/2004 | Grabelsky et al. | 709/206 |
| 2006/0047568 A1* | 3/2006 | Eisenberg et al. | 705/14 |
| 2011/0145729 A1* | 6/2011 | Shulman | 715/760 |
| 2011/0154498 A1* | 6/2011 | Fissel et al. | 726/25 |
| 2012/0329489 A1* | 12/2012 | McGary | 455/466 |

* cited by examiner

*Primary Examiner* — Zarni Maung (57) ABSTRACT

In one exemplary embodiment, a system includes a method of providing Internet content through a text-messaging service includes receiving an Internet search query in a text message from a mobile device. The text message includes a query term and an application code. The application code identifies an Internet-based application. The text message is converted to a peer-to-peer message protocol message. An Internet-application server include the internet-based application is identified with the application code. The Internet search query is converted from the text message to a peer-to-peer message protocol message. The peer-to-peer message protocol message is forwarded to the Internet-application server. A query response is received from the Internet-based application. The query response is converted into a text message response. The text message response is communicated to the mobile device.

2 Claims, 9 Drawing Sheets

SYSTEM AND METHOD FOR PROVIDING INTERNET CONTENT THROUGH SMS SERVICES

CROSS-REFERENCE TO RELATED APPLICATIONS

This application claims priority under 35 U.S.C. §119 to Indian Patent Application Number IN 3384/CHE/2012, filed at the Indian Patent Office on the 14 Sep. 2012, the disclosure of which is incorporated herein by reference.

BACKGROUND

1. Field

This application relates generally to media content, and more specifically to a system and method for providing Internet content through SMS services.

2. Related Art

In developing countries, a substantial portion of the population may lack phones with data plans and/or the capability to access internet information. Such persons may therefore be unable to access information that could substantially improve their lives, ability to work, and/or obtain necessary healthcare. Accordingly, improvements may be made over conventional methods of providing information obtained via the internet.

BRIEF SUMMARY OF THE INVENTION

In one aspect, a method of providing Internet content through a text-messaging service includes receiving an Internet search query in a text message from a mobile device. The text message includes a query term and an application code. The application code identifies an Internet-based application. The text message is converted to a peer-to-peer message protocol message. An Internet-application server include the Internet-based application is identified with the application code. The Internet search query is converted from the text message to a peer-to-peer message protocol message. The peer-to-peer message protocol message is forwarded to the Internet-application server. A query response is received from the Internet-based application. The query response is converted into a text message response. The text message response is communicated to the mobile device.

Optionally, the text message can be a short-messaging system message. The Internet-based application can be a proprietary application developed and managed by a third party. A short-message service center can receive the Internet search query in a text message from a mobile device and can convert the text message to the peer-to-peer message protocol message.

BRIEF DESCRIPTION OF THE DRAWINGS

The present application can be best understood by reference to the following description taken in conjunction with the accompanying figures, in which like parts may be referred to by like numerals.

FIGS. 6 A-B depict an example process for providing Internet content through SMS services, according to some embodiments.

The Figures described above are a representative set, and are not an exhaustive with respect to embodying the invention.

DETAILED DESCRIPTION

Disclosed are a system, method, and article of providing Internet content through SMS services. Although the present embodiments included have been described with reference to specific example embodiments, it can be evident that various modifications and changes may be made to these embodiments without departing from the broader spirit and scope of the particular example embodiment.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Exemplary Process

In some developing countries, internet usage may apply to only a small part of the population, such as twenty-percent (20%) or less. In these countries, however, seventy-percent (70%) of the population may be offline mobile users with phones capable of communicating via SMS. Thus, in order to provide the benefits of internet access to these users, various embodiments of the system uses SMS technology to provide an internet pipe to such persons. Rather than simply using SMS for peer to peer text and image services, embodiments of the system leverage SMS to provide access to internet content and/or to provide communication for alternate services beyond simply text messages. In some embodiments, SMS may be used to transmit information for software applications involving games, social networking services, and/or financial transactions. In addition, SMS may permit a user to access cloud storage for such purposes as Embodiments of the invention may include a mobile device user interface that receives a user's inputs and displays outputs. Embodiments of the invention may also include an operating system capable of supporting dozens or thousands of applications designed to use SMS to communicate. In various phone applications, a user interface may be provided to allow a user to provide inputs or receive outputs for information conveyed via SMS. For example, a user may play games such as chess, tic-tac-toe, or card games against players or a server, and player or CPU movements may be transmitted via SMS. In some embodiments, a mobile device user may store and/or access information stored in cloud storage via SMS. Such information may include contacts, logs, text messages, passwords, e-mail, and other information.

In other embodiments, the system may provide parents with an option to receive SMS location updates for their children, such as from a watch with an embedded GSM module. The system may include a health device that alerts Doctors with respect to the location of a patient in the event of an emergency. In other embodiments, the system may receive and process a vehicle's operational parameters. In the event of an emergency, the system may update emergency contacts, service centers, and/or emergency personnel such as ambulances.

In another embodiment, a chat application may permit users to chat with anonymous users without disclosing their mobile number. The system may permit access to multiple aspects of Facebook®, including: wall posts, newsfeeds, messages, notifications, status updates, friend requests, birthday reminders, and creation of a new account. The system may further provide local city information such as classifieds, best deals and discounts, searching for ATMs, restaurants, etc., and/or lead generation for completing transactions. The system may also provide health information, such as consultation of doctors, general health, sexual health, or exchanging information on a physical device through SMS. The system may provide options for mobile learning such as sports, academics, extracurricular, computer skills, and job search tips and listings. The system may also assist with governance. For example, the system may be used to provide information on how to get a license, passport etc. The system may also allow users to report problems, or obtain information from the government regarding status, enquiries, rules and regulations, or general information gathering. Additional information regarding some embodiments of the invention is described in greater detail below with respect to the figures.

Exemplary Environment and Architecture

Figure 1:
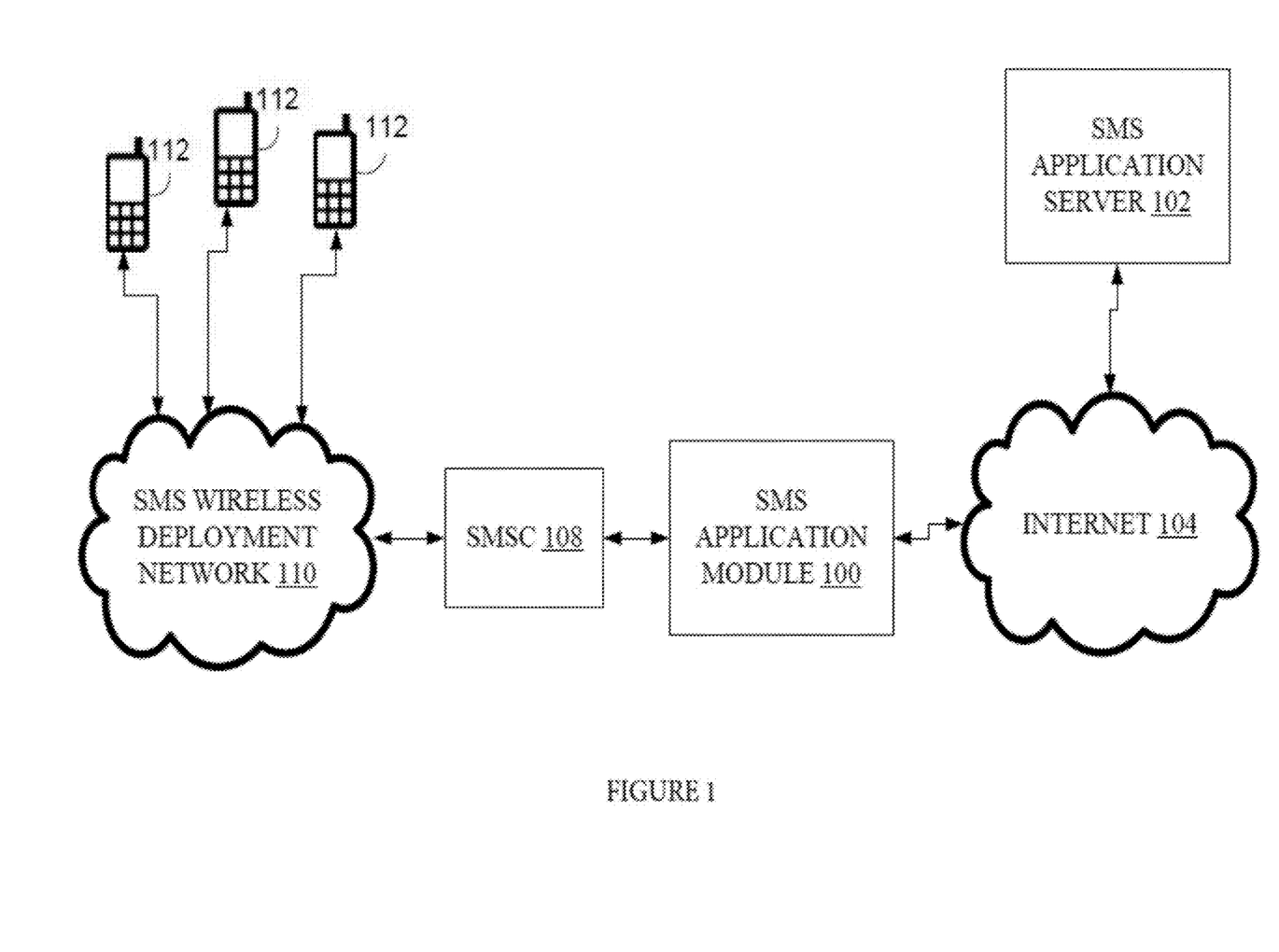
FIG. 1 depicts, in block diagram format, an example system for providing Internet content through SMS services, according to some embodiments.

FIG. 1 is a schematic diagram of components that may be included in and/or work with a system for providing Internet content through SMS (and/or other text-messaging) services, according to an embodiment. FIG. 1 includes a short messaging system (SMS) application module 100, an SMS application server 102, internet 104, a short messaging service center (SMSC) 108, and mobile devices 112. The system may include external short message entities (ESMEs) that can include voice mail, a web interface, email, and other ESMEs. An ESME may include an external application that communicates with an SMSC 108 to send and/or receive SMS messages. Examples of ESMEs may include systems that send automated marketing messages to cell phone users, or voting systems that process votes sent via SMS from mobile users. Generally, an entity that is not an actual mobile user (e.g., a cell phone user) that sends or receives SMS messages may include or operate through an ESME. The SMS application module 100 may include one or more ESMEs.

The system may operate on one or a combination of the mobile device(s) 112, the SMS application module 100, and the SMS application server 102. For example, the system may include software and/or hardware of the mobile devices 112, with or with additional software and/or hardware. In other embodiments, the system may include software and/or hardware of the SMS application module 100, with or with additional software and/or hardware. In other embodiments, the system may include software and/or hardware of the SMS application server 102, with or with additional software and/or hardware.

The SMSC 108 may store and forward SMS messages between mobile devices 112, an ESME (e.g., voice mail, web, email), and/or the SMS application module 100. When an SMS message is sent to or from the mobile devices 112, the message may be transferred through the SMSC 108, which relays the message when the recipient is available. If the recipient is unavailable, the SMSC 108 may store the SMS message, thus regulating the SMS process.

The SMS deployment network 110 may include multiple wireless network elements and components to relay SMS messages to and from one of the mobile devices 112 and the second mobile device 108. For example, the SMS deployment network 110 may include components to manage wireless transmission of an SMS message sent from an ESME via the SMSC 108 to one of the mobile devices 112, or the SMS application module 100. The SMS deployment network 110 may include an air interface such as one or more cell towers that wirelessly relay data to and from at least one of the mobile devices 112, a mobile switching center (MSC) for routing voice, fax, or SMS communications through a network, and a home location register (HLR) (not shown). The HLR may be a central database that contains details of each mobile phone subscriber that is authorized to use a GSM core network, including details of SIM cards issued by a mobile phone operator. Each SIM may be associated with a unique international mobile subscriber identity (IMSI) that acts as the primary key to each HLR record. Each SIM may also have one or more MSISDNs, which is the telephone number used by a mobile phone to make and receive calls, with the primary MSISDN being used to make and receive voice calls and SMS. An HLR may also store data for each IMSI record including: GSM services that the subscriber may use, GPRS settings to permit the user to access packet services, current location of the subscriber (VLR and serving GPRS support node/SGSN), and call divert settings.

It is noted that in other examples, other types of text messaging systems (e.g. EMS (Enhanced Messaging Service), MMS (Multimedia Messaging Service), proprietary messaging systems such those associated with BlackBerry® Messenger, iMesseges®, Facebook's® mobile messenger service, Microsoft Messenger service, another instant messaging program that utilizes WAP (Wireless Application Protocol), etc.) can be utilized in lieu and/or in addition to SMS systems when available.

Figure 2:
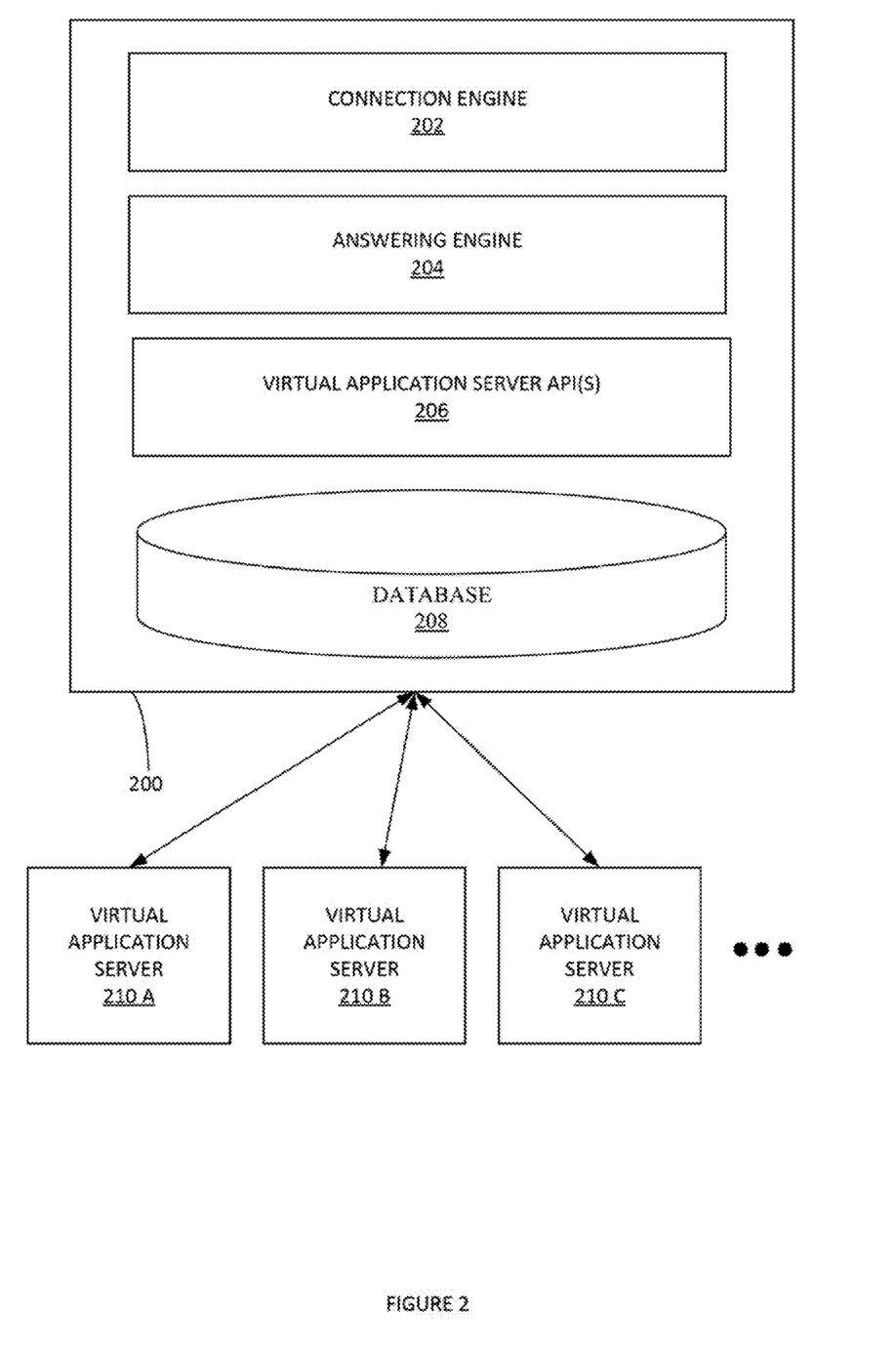
FIG. 2 provides an example of a system server, according to some embodiments.

FIG. 2 provides an example of a system server 200 (e.g. SMS application module 100), according to some embodiments. A user can send a web search query as an SMS message to the short code or long code provided for the proprietary server system (e.g. Innoz's 55444 system, Innoz's SMSGyan and the like) by the operator. In some embodiments, the long code can be utilized by the operator (e.g. an SMSC) to identify where to forward the user's SMS. In this way, the long code can facilitate determining the user-operator-application relation. The SMS query message can reach an operator's SMSC. From the SMSC, the query message can be forwarded to the proprietary server system through a peer-to-peer message protocol such as a Short Message Peer-to-Peer (SMPP) protocol. A connection engine 202 (e.g. a Java-based engine) can be used to maintain the SMPP connectivity to the SMSC. Connection engine 202 can receive the query and forwards it to an answering engine implemented in the proprietary server system (e.g. over a Hypertext Transfer Protocol (HTTP) request). An answering engine 204 can perform initial intake operations such as parse the incoming query message, perform a spell check using a custom spell checker, analyses the query based on keywords and syntax, performs a search with a search engine on a knowledge base and/or pull data from the internet. Answering engine 204 can use a caching server with data storage (e.g. database 208) for frequently needed non-persistent data, for purposes like session maintenance, etc. The result is then returned to connection engine 202 which sends the reply SMS (or other text message protocol message) through the SMSC (or other text messaging protocol center such as an MMSC, other type of store and forward server, etc.). Offline analytics can be performed by taking a snapshot of live databases (e.g. database 208) and importing it to a data-analysis application (e.g. Infobright® storage). It is noted that system server 200 can communicate with one or more virtual application servers 210 A-C. Virtual application servers 210 A-C can be cloud hosted and implement various applications. Each application can include one or more specialized functionalities (e.g. Internet search, arithmetic engine, music lyric search engine, movie search engine, chat engines, recipe databases, ticket booking engines, news applications, weather applications, game applications, etc.). Content associated with an application can be retrieved from a virtual application server associated with the application (e.g. with Simplified Host Engine Fetch). Applications can be developed and/or managed by third-party developers. Server system 200 can be provided with application information (e.g. location, functionalities, age-restrictions, and the like). Application responses can be obtained by the server system 200 can then sent through the system of FIG. 1 to a user device, where it can be received as an SMS message. Server system 200 can give results to questions asked in natural language via an SMS message and does not require the user to mention a keyword. Keyword based usage can be an additional feature utilized in some embodiments. Server system 200 can include natural language interpretation processing engines (not shown).

Figure 3:
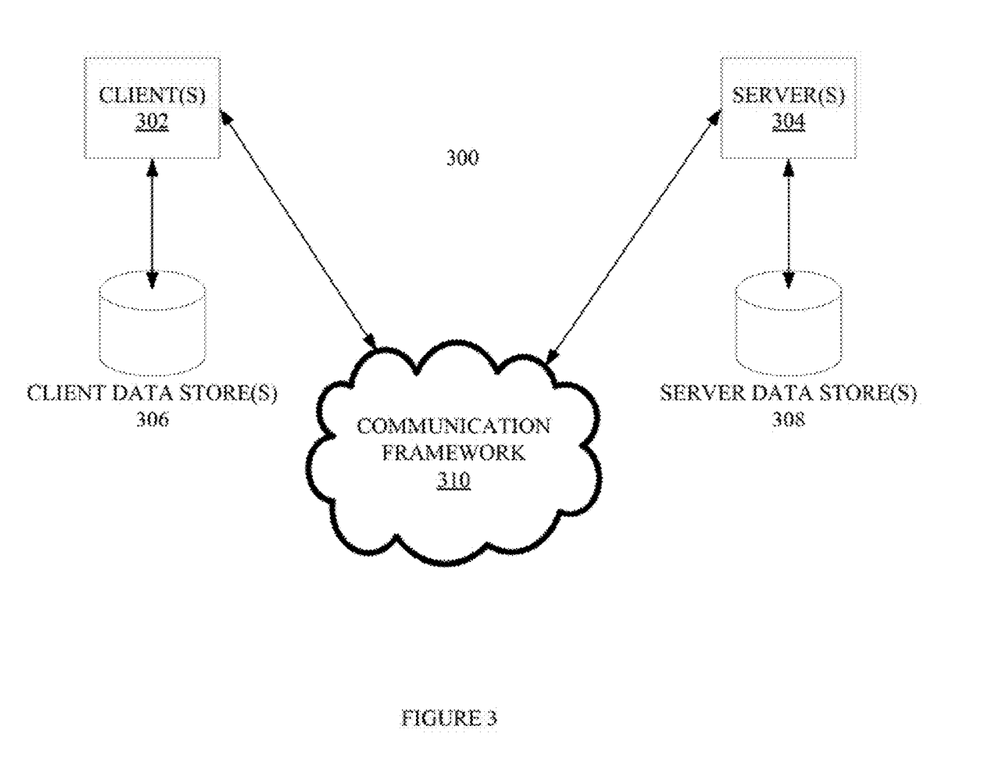
FIG. 3 is a block diagram of a sample computing system that can be utilized to implement some embodiments.

FIG. 3 is a block diagram of a sample computing system 300 that can be utilized to implement some embodiments. The system 300 includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can be include and/or be utilized by the various systems and/or methods described herein.

Figure 4:
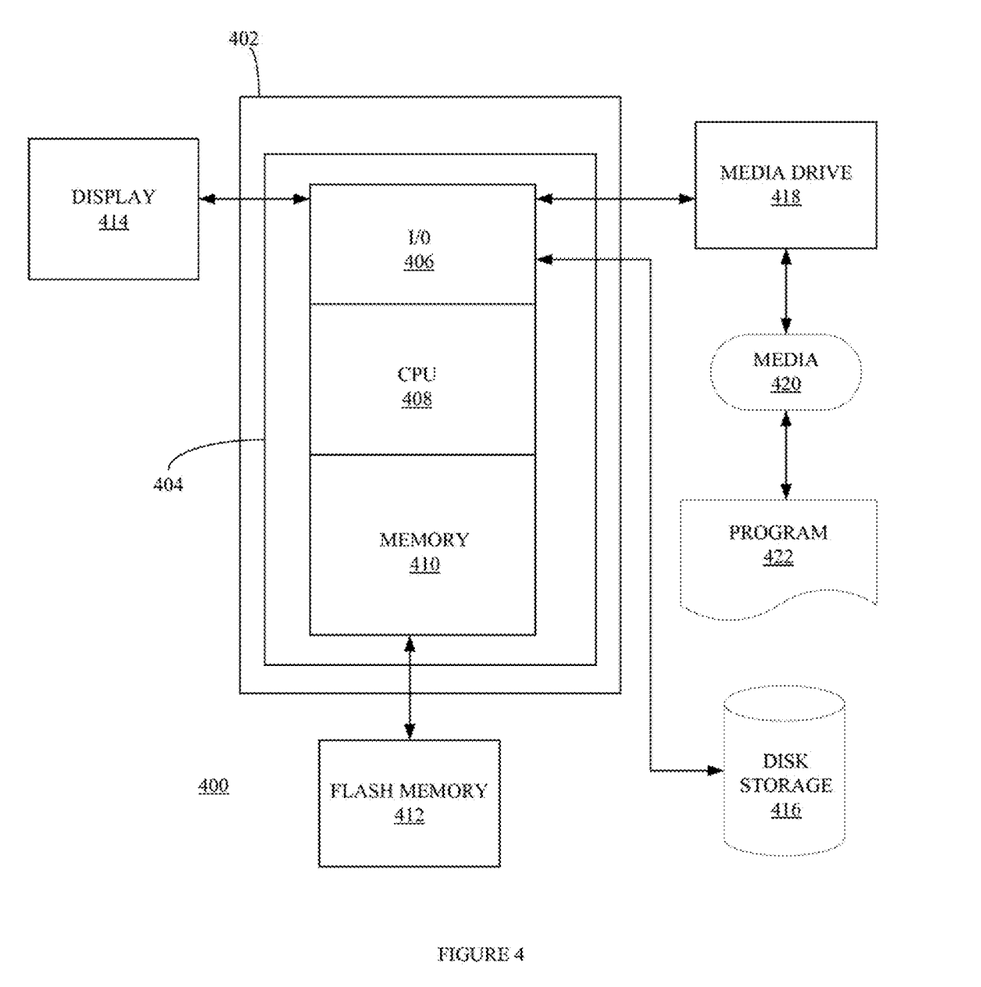
FIG. 4 depicts an exemplary computing system that can be configured to perform any one of the processes provided herein.

FIG. 4 depicts an exemplary computing system 400 that can be configured to perform any one of the processes provided herein. In this context, computing system 400 may include, for example, a processor, memory, storage, and I/O devices (e.g., monitor, keyboard, disk drive, Internet connection, etc.). However, computing system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

FIG. 4 depicts computing system 400 with a number of components that may be used to perform any of the processes described herein. The main system 402 includes a motherboard 404 having an I/O section 406, one or more central processing units (CPU) 408, and a memory section 410, which may have a flash memory card 412 related to it. The I/O section 406 can be connected to a display 414, a keyboard and/or other user input (not shown), a disk storage unit 416, and a media drive unit 418. The media drive unit 418 can read/write a computer-readable medium 420, which can contain programs 422 and/or other data. Computing system 400 can include a web browser. Moreover, it is noted that computing system 400 can be configured to include additional systems in order to fulfill various functionalities.

Exemplary Process

Figure 5:
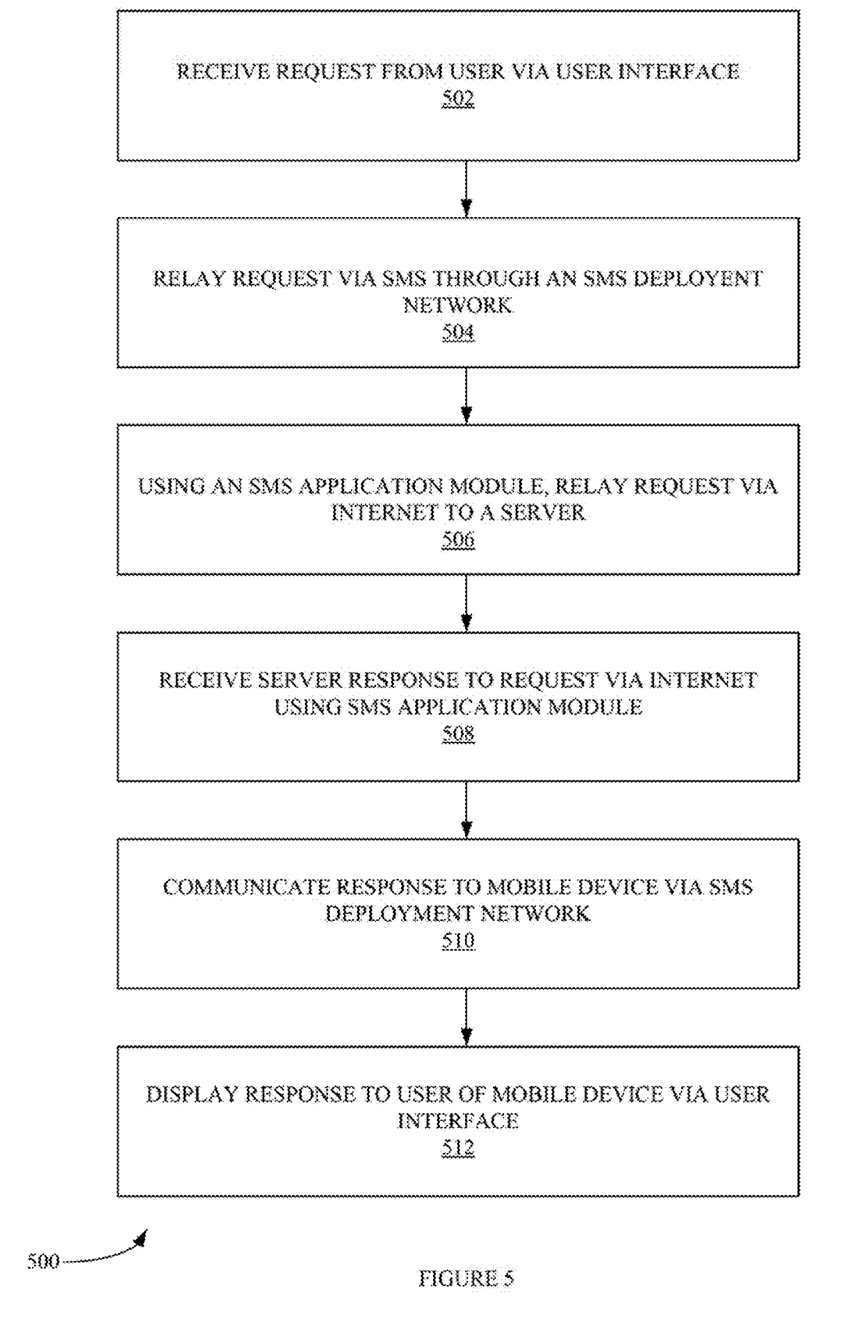
FIG. 5 is a process flow illustrating operation of the system, according to an embodiment.

FIG. 5 is a process flow illustrating operation of the system, according to an embodiment. The system may be represented by the system 100, 200, 300 and/or the computing system 400, and the SMS application module 100 may be a software or hardware component. The SMS application module 100 may include operation of a program running on a client and/or a server (e.g. such as 102 or 200). The program may be stored in the memory section 410, the flash memory card 412, the disk storage unit 416, and/or the computer-readable medium 420. The SMS application module 100 may comprise a client, the server and/or the CPU 408 as configured by software to perform the operations of the system and method according to various embodiments.

In operation 502, the system may receive a request from a user via the user interface of a mobile device 112. For example, the request may be for sports scores, movie listings, nearby restaurants, or other information.

In operation 504, the system may relay the request via SMS through an SMS deployment network 110 and/or through an SMSC 108 to the SMS application module 100.

In operation 506, the system may receive a server response to the request via the internet 104 from the internet application server 102 and/or another server. The system may receive the response using the SMS application module 100.

In operation 508, the system may communicate the response to the mobile device 112 via SMS through the SMS deployment network 110.

In operation 510, the system may display the response to the user of the mobile device 112 via the user interface. Requests and responses for information may include such topics as Local News, Political News, National News, Weather News, and International News. Other topics may include devotional, Bollywood, hangouts, sex, cricket, music, food, football, learning, health, events, chat, and deals. In some embodiments, the systems of FIGS. 1-4 can be utilized to perform process 500.

Figure 6A:
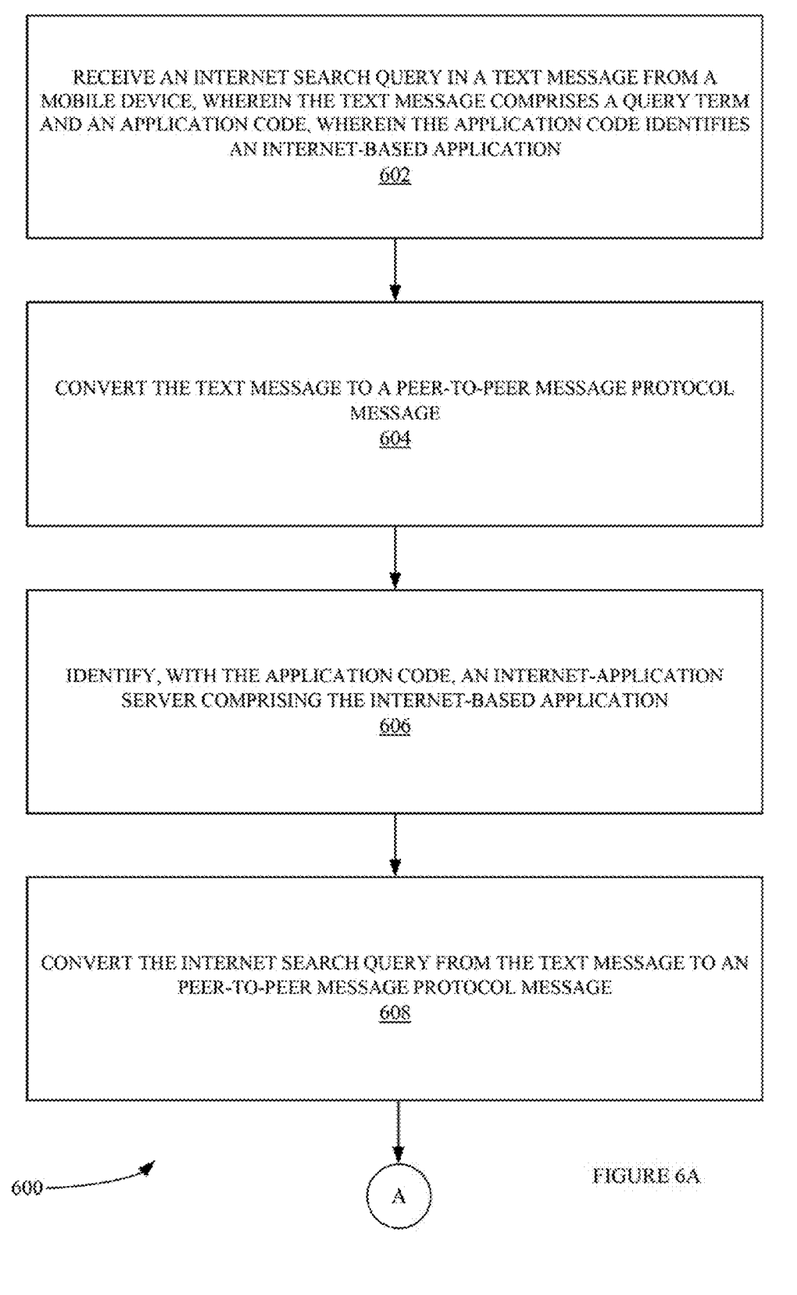
Figure 6B:
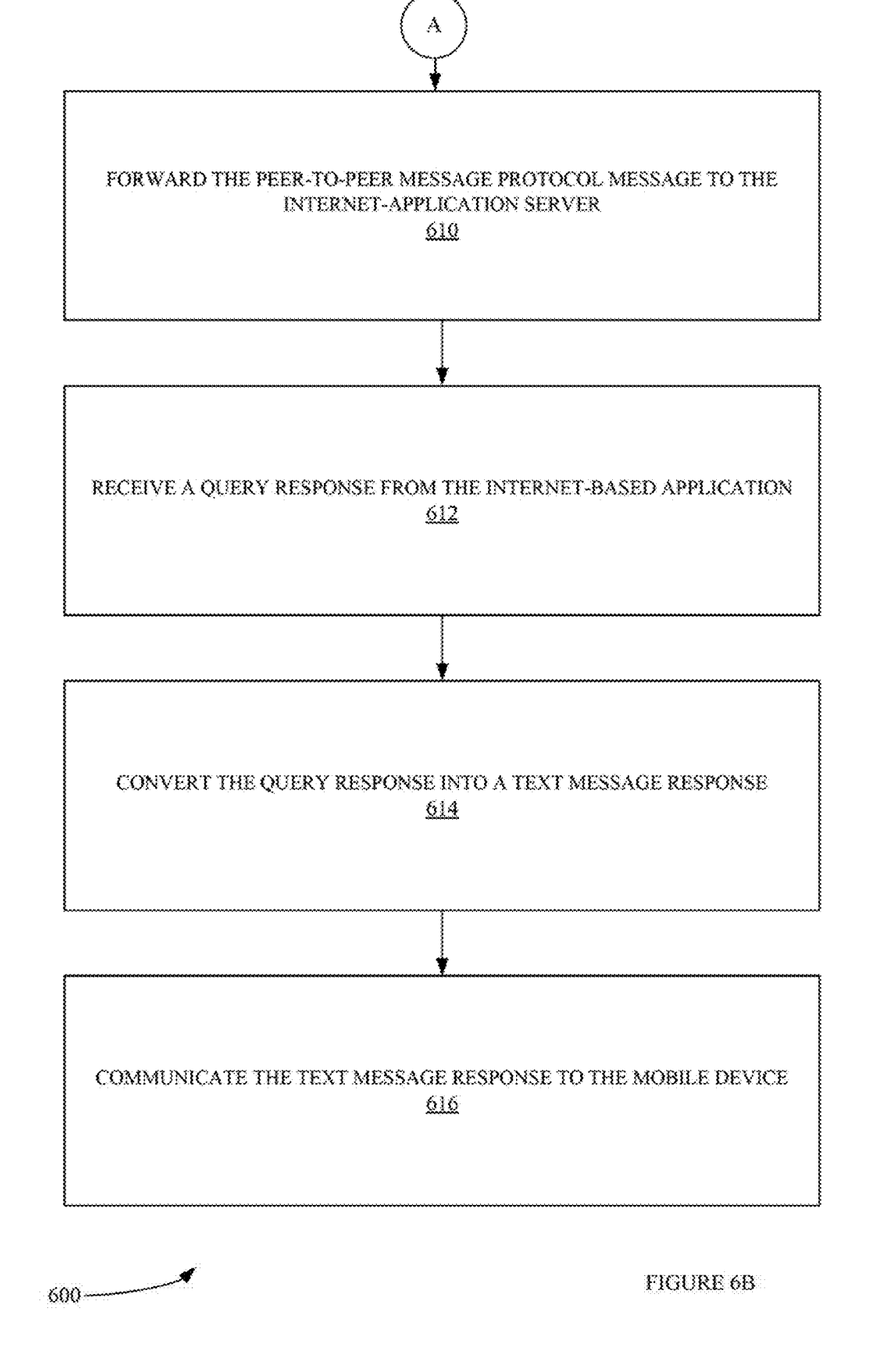

FIG. 6 depicts an example process 600 for providing Internet content through SMS services. In step 602 of process 600, an Internet search query in a text message is received from a mobile device, wherein the text message comprises a query term and an application code, wherein the application code identifies an Internet-based application. In step 604, the text message is converted to a peer-to-peer message protocol message. In step 606, an Internet-application server including the Internet-based application is identified using the application code. In step 608, the Internet search query is converted from the text message to a peer-to-peer message protocol message. In step 610, the peer-to-peer message protocol message is forwarded to the Internet-application server. In step 612, a query response is received from the Internet-based application. In step 614, the query response is converted into a text message response. In step 616, the text message response is communicated to the mobile device. In some embodiments, the systems of FIGS. 1-4 can be utilized to perform process 600.

Exemplary Use Cases

Figure 7:
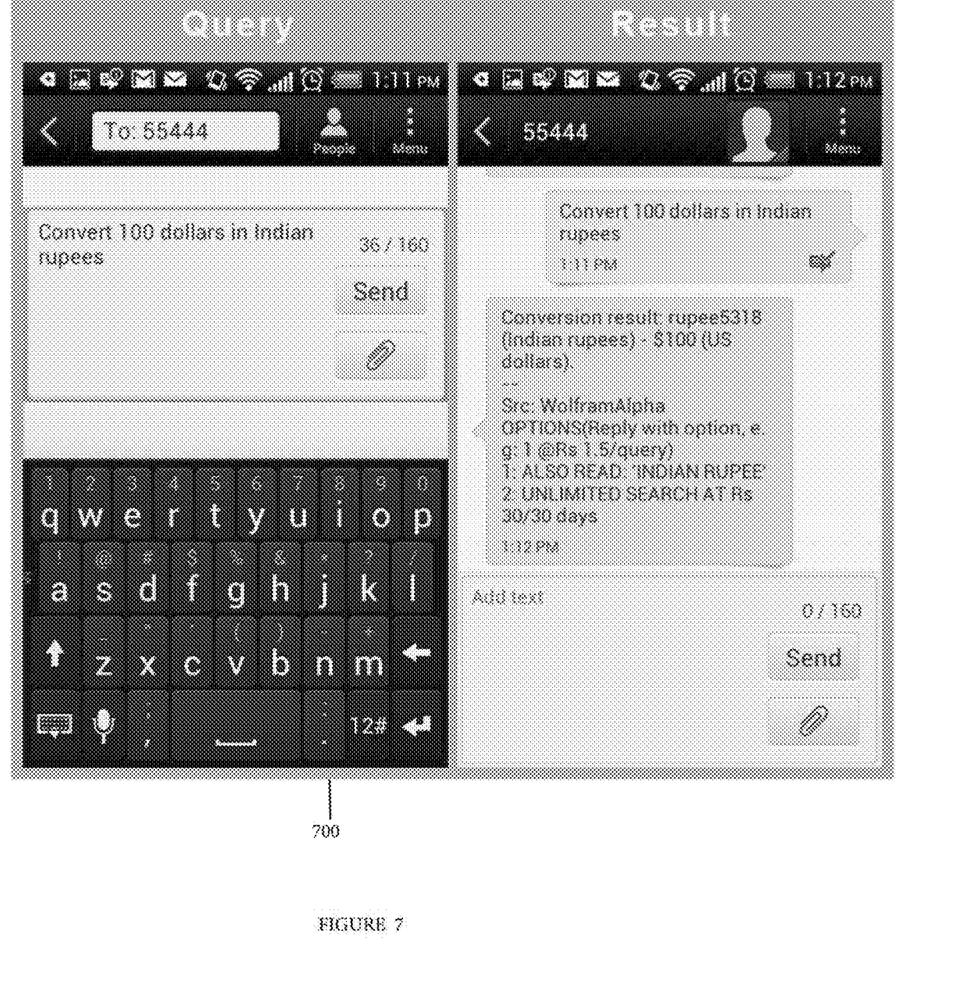
FIG. 7 illustrates an example user view from a mobile device display of providing Internet content through SMS services, according to some embodiments.

FIG. 7 illustrates an example user view 700 from a mobile device display of providing Internet content through SMS services, according to some embodiments. User view 700 depicts a user providing an inquiry in the form of an SMS message addressed to an example of system server 200. System server 200 can receive the query to convert US $100.00 to Indian rupees. System server 200 can parse and analyze the query to determine its meaning. System server 200 can determine and locate an appropriate entity for obtaining a response to the query. The entity can be a module operating in system server 200, an Internet source such as a virtual application server (e.g. with a currency conversion application operated by a third-party entity), a web-server associated with a currency converter, and/or information stored in database 208. System server 200 can obtain the query response, convert the query response to an SMS format, include metadata about the query response (e.g. source, time stamp, and the like), and/or create a response SMS. System server 200 can then communicate the response SMS to the user's mobile device. User view 700 illustrates an example review of a display of the query response.

Figure 8:
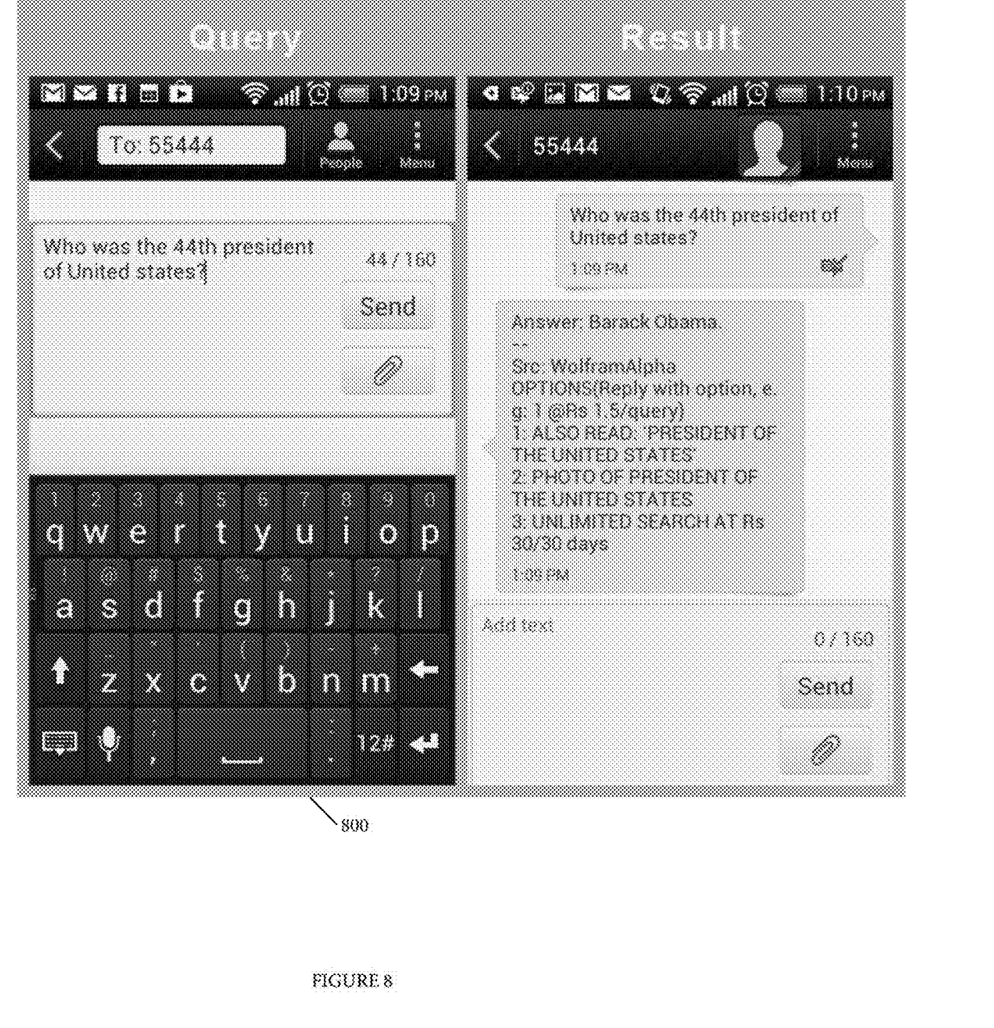
FIG. 8 illustrates another example user view from a mobile device display of providing Internet content through SMS services, according to some embodiments.

FIG. 8 illustrates another example user view 800 from a mobile device display of providing Internet content through SMS services, according to some embodiments. User view 700 depicts a user providing an inquiry in the form of an SMS message addressed to an example of system server 200. System server 200 can receive the query to identify the forty-fourth president of the United States. System server 200 can parse and analyze the query to determine its meaning. System server 200 can determine and locate an appropriate entity for obtaining a response to the query. The entity can be a module operating in system server 200, an Internet source such as a virtual application server (e.g. with a database of United State history) and/or information stored in database 208. System server 200 can obtain the query response from the Internet source, convert the query response to an SMS format, include metadata about the query response (e.g. source, time stamp, and the like), and/or create a response SMS. System server 200 can then communicate the response SMS to the user's mobile device. User view 800 illustrates an example review of a display of the query response.

At least some values based on the results of the above-described processes can be saved for subsequent use. Additionally, a (e.g. non-transients) computer-readable medium can be used to store (e.g., tangibly embody) one or more computer programs for performing any one of the above-described processes by means of a computer. The computer program may be written, for example, in a general-purpose programming language (e.g., Pascal, C, C++, Java, and/or Python) and/or some specialized application-specific language (PHP, Java Script, XML).

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium. Finally, acts in accordance with FIGS. 1-8 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"). Programmable Gate Arrays and flash devices.

What is claimed as new and desired to be protected by Letters Patent of the United States is:

1. A computer system for sending a text message from a user of a user device to an Internet-application server comprising the Internet-based application, the system comprising:
  (a) a computer store configured to store the text message from the user of the user device;
    (i) wherein the text message comprises a query term and an application code;
    (ii) wherein the application code identifies an Internet-based application; and (b) a computer server in a short message service center (SMSC), which computer server is coupled to the computer store and programmed to:
  (i) obtain the text message from the computer store;
  (ii) identify an Internet-based application identified based on the application code;
  (iii) create, from the text message in the computer store, and without the need of installing an additional software on the user device, an Internet search query, and wherein the Internet search query comprises a natural language term;
  (iv) convert the text message to a peer-to-peer message protocol message;
  (v) communicate the peer-to-peer message to an Internet-application server that comprises the Internet-based application identified by the application code stored in the computer store;
  (vi) receive a query response from the Internet-based application;
  (vii) convert the query response into a text message response, and communicate the text message response to the user device with a text-message protocol; and
  (viii) cause the user device to display the text message response with a user device display, and wherein a cost of a response to the Internet search query by the Internet-based application is displayed with the text message response, and wherein an identity of the Internet-based application is displayed with the text message response.

2. The computer system of claim 1, wherein the text message and the text message response comprises are short messaging system (SMS) messages.

* * * * *